July 3, 1956 — W. H. ELLIOT — 2,753,506
MOTOR SPEED CONTROL SYSTEMS
Filed Jan. 25, 1954 — 2 Sheets-Sheet 1

Inventor
William H. Elliot
By W. C. Lyon
Attorney

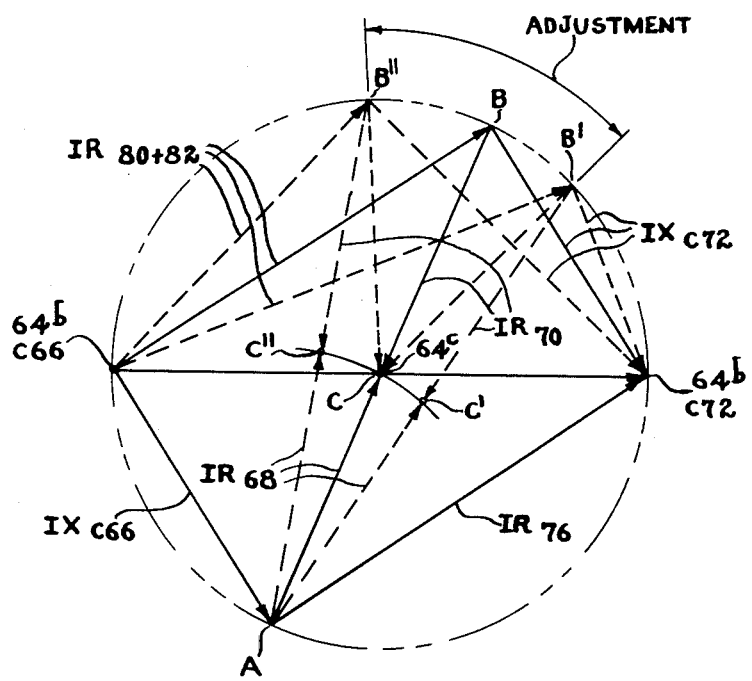

United States Patent Office 2,753,506
Patented July 3, 1956

2,753,506

MOTOR SPEED CONTROL SYSTEMS

William H. Elliot, Whitefish Bay, Wis., assignor to Cutler-Hammer, Inc., Milwaukee, Wis., a corporation of Delaware Application January 25, 1954, Serial No. 405,745

10 Claims. (Cl. 318—331)

This invention relates to improvements in motor speed control systems and, it relates more particularly to such systems of the electronic type.

A primary object of the invention is to provide an improved motor speed control system affording superior performance at a minimum of cost.

Another object is to provide a motor speed control system the components of which are utilized to full extent by their arrangements to perform multiple functions and otherwise so that a minimum of components need be employed.

Another object of the invention is to provide improved methods and means for controlling the speed of electric motors through the medium of electron tubes.

Another object of the invention is to provide an improved alternating voltage phase-shifting network.

Other objects and advantages of the invention will hereinafter appear.

The accompanying drawings will now be described, it being understood that various modifications may be made in the embodiment illustrated and that other embodiments are possible without departing from the spirit of the invention or the scope of the appended claims.

In the drawings,

Fig. 2 is a vector diagram of the time-voltage relationships in the phase-shift circuit shown in Fig. 1.

Figure 1:
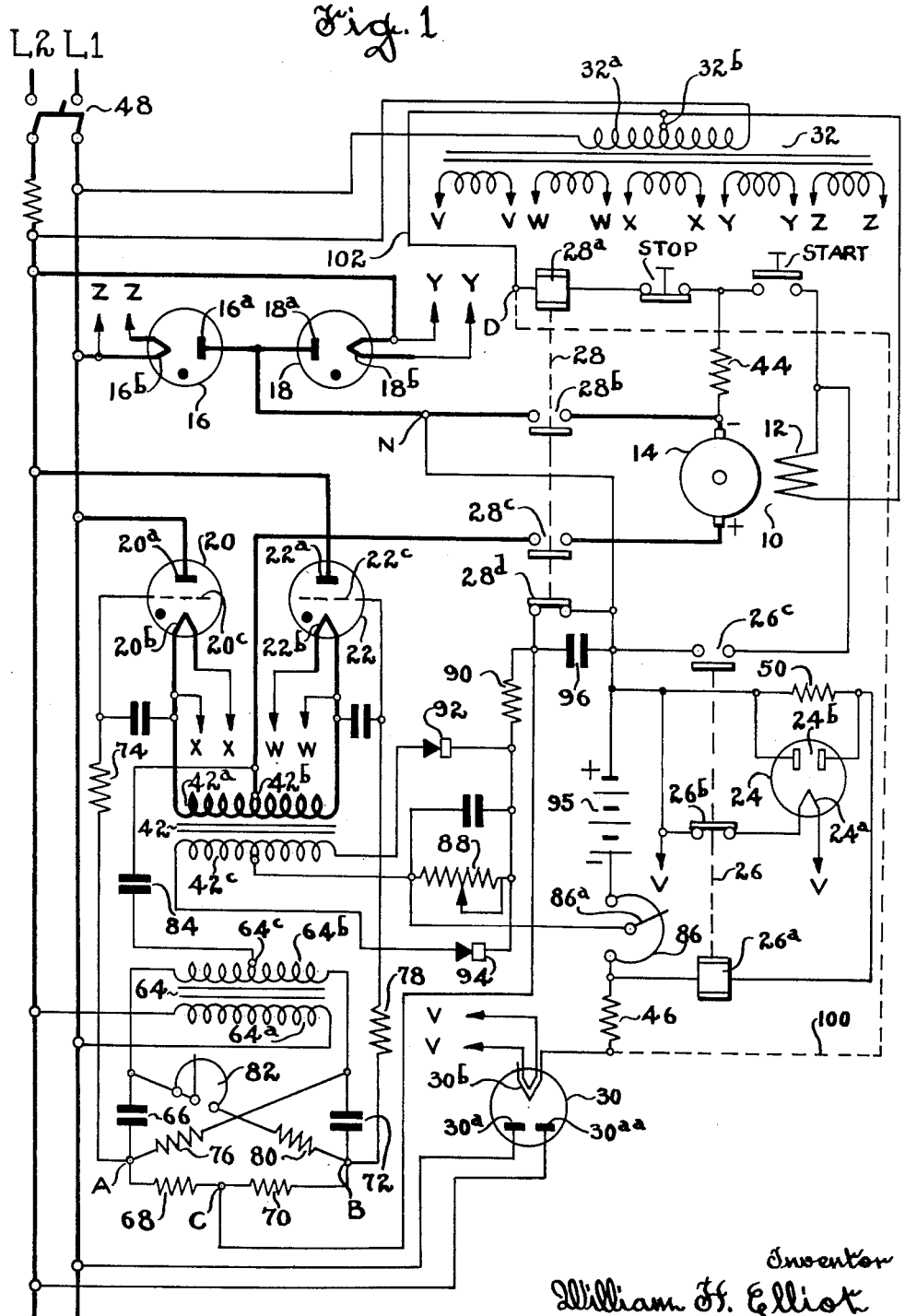
Figure 1 illustrates diagrammatically a system embodying the invention.

Referring to Fig. 1, there is shown an electronic motor drive system. The motor 10 is powered by unidirectional current derived from an alternating current supply source such as lines L1 and L2. During operation of the drive, the current in the field winding 12 of the motor is not adjusted. The magnitude of the current supplied to the armature 14 is regulated to control the speed of the motor.

Rectified alternating current is supplied to the armature 14 through a bridge rectifier circuit comprising diode rectifier tubes 16 and 18 and thyratron tubes 20 and 22. The amount of current which is supplied to armature 14 is regulated by controlling the time, during the period when the anode of each of tubes 20 and 22 is positive with respect to its cathode, at which said tubes are rendered conductive. The control voltage for the thyratrons is applied between the control electrode and cathode of each of the tubes and comprises an alternating voltage component which lags the anode-cathode voltage of the respective tubes by a fixed electrical angle of approximately 120 degrees. The control voltage also has a unidirectional component which is varied to determine the firing point of the tubes 20 and 22 in accordance with desired motor speed and the IR drop in armature 14. During starting the unidirectional voltage component of the control voltage is modified to provide timed acceleration of the motor 10.

The system includes a time delay relay 24 which delays the energization of a control relay 26 until the tubes are sufficiently heated to permit their being fully loaded without being damaged. When energized control relay 26 acts to energize field winding 12 and to make it possible to energize a main contactor 28 to energize armature 14 by closing a "Start" switch.

The components and circuit connections of the system, as illustrated in the drawing, are described as follows:

Time delay relay 24 comprises a heater element 24$^a$ and normally open contacts 24$^b$.

Control relay 26 comprises an operating winding 26$^a$, normally closed contacts 26$^b$ and normally open contacts 26$^c$.

Main contactor 28 has an operating winding 28$^a$, normally open contacts 28$^b$ and 28$^c$, and normally closed contacts 28$^d$.

Tubes 16, 18, 20 and 22 each comprise an anode 16$^a$, 18$^a$, 20$^a$ and 22$^a$ and a cathode 16$^b$, 18$^b$, 20$^b$ and 22$^b$, respectively. Tubes 20 and 22 each also have a control electrode 20$^c$ and 22$^c$, respectively. Another tube 30, is a dual, high-vacuum rectifier having anodes 30$^a$ and 30$^{aa}$ and a common cathode 30$^b$. The cathodes of the tubes and the heater element 24$^a$ of delay relay 24 are heated by power supplied by a respectively associated one of the secondary windings VV, WW, XX, YY and ZZ of a transformer 32.

The primary windings 32$^a$ of transformer 32 is connected across lines L1 and L2 and the center tap 32$^b$ of winding 32$^a$ is connected to one side of contacts 26$^c$ through field winding 12. Connected in parallel with field winding 12, is a series circuit comprising coil 28$^a$, a normally closed "Stop" switch and a normally open "Start" switch. The other side of contacts 26$^c$ is connected to a common point in the system designated N.

Anodes 16$^a$ and 18$^a$ are connected to point N and cathodes 16$^b$ and 18$^b$ are connected directly to lines L1 and L2, respectively. Anode 20$^a$ is connected to line L1 and anode 22$^a$ is connected to line L2. Cathodes 20$^b$ and 22$^b$ are connected to the respective ends of primary winding 42$^a$ of a transformer 42.

The center tap 42$^b$ of winding 42$^a$ is connected to the positive side of armature 14 through contacts 28$^c$. The negative side of said armature is connected to point N through contacts 28$^b$ and to the connection between the "Stop" and "Start" switches through a resistor 44.

Point N is connected to cathode 30$^b$ of tube 30 through a series circuit comprising normally open contacts 24$^b$ of time delay relay 24, operating winding 26$^a$ of relay 26 and a limiting resistor 46. Contacts 26$^b$ are connected in series with the heater element 24$^a$, and secondary winding VV, one side of which is connected to point N. The anodes 30$^a$ and 30$^{aa}$ are connected to lines L1 and L2, respectively.

The system thus far described operates as follows: Upon closure of line switch 48, power is applied to transformer 32 and the cathodes of all the tubes begin to be heated. Alternating voltage is applied across the anodes and cathodes of tubes 16, 18 and 30. These tubes are connected to form a bridge rectifier to supply a small amount of unidirectional current to coil 26$^a$ and a resistor 50 which shunts contacts 24$^b$. This current is limited by resistor 50 to a value less than that required in coil 26$^a$ to open contacts 26$^b$. Thus the power circuit to heater element 24$^a$ remains continuous and said element is heated.

After a predetermined time sufficiently long to allow cathodes 16$^b$, 18$^b$, 20$^b$ and 22$^b$ to be heated, contacts 24$^b$ close and short-circuit resistor 50. The current in operating winding 26$^a$ is increased. Contacts 26$^b$ open to interrupt the heater 24$^a$ circuit and contacts 26$^c$ are closed. Upon closure of contacts 26$^c$, tubes 16 and 18 and transformer 32, which are connected to form a conventional or diametric full-wave rectifier, supply unidirectional current to field winding 12.

When the "Start" switch is closed, coil 28ª is energized in parallel with field winding 12. Contacts 28ᵇ and 28ᶜ are closed so that alternating voltage is applied between the plate and cathode of tubes 20 and 22 and armature 14 is energized.

The alternating component of the thyratron control voltage is developed in a phase-shift circuit which includes a transformer 64 whose primary winding 64ª is connected to lines L1 and L2. The secondary winding 64ᵇ of this transformer is connected in a loop circuit comprising, in order, said winding 64ᵇ, a capacitor 66, a terminal A, a resistor 68, a terminal C, a resistor 70, a terminal B, and a capacitor 72. Terminal A is connected to control electrode 20ᶜ of tube 20 through a grid current limiting resistor 74 and to the connection between winding 64ᵇ and capacitor 72 through a resistor 76. Terminal B is connected to control electrode 22ᶜ of tube 22 through a grid current limiting resistor 78 and to the connection intermediate winding 64ᵇ and capacitor 66 through the series combination of a resistor 80 and a balancing rheostat 82. A by-pass capacitor 84 interconnects center tap 42ᵇ of winding 42ª of transformer 42 and the center tap 64ᶜ of the secondary winding 64ᵇ of transformer 64 so that these taps are maintained at substantially the same alternating potential. The unidirectional components of the control voltage are added to this circuit between terminal C and center tap 42ᵇ.

The impedances of capacitors 66 and 72 and resistors 76, 80 and 82 act to shift the phase of the voltages appearing between center tap 64ᶜ and points A and B, respectively, with respect to the voltage impressed across lines L1 and L2.

Thus the alternating component of the control voltage applied between the control electrode and cathode of tube 20 is the alternating voltage appearing between center tap 64ᶜ and point A. The alternating component of the control voltage applied between the control electrode of tube 22 is the alternating voltage appearing between center tap 64ᶜ and point B.

The phase relationship of the alternating control voltage between center tap 64ᶜ and point B, with respect to that between L1 and L2, may be altered by adjustment of rheostat 82 to adjust the tubes for equal current flow if their respective grid characteristics differ.

The operation of the phase-shifting circuit may be understood from an examination of the vector diagram of Fig. 2. The ends of the various vectors are labeled to correspond to points in the circuit of Fig. 1. Points B¹ and B¹¹ represent the limits of the phase variation in the alternating voltage between points 64ᶜ and B possible to be attained by adjustment of rheostat 82. C¹ and C¹¹ represent the potential at point C when rheostat 82 is adjusted to its respective extreme positions.

This phase-shift network makes possible the application to the thyratrons of alternating control voltages individualized to said thyratrons as required in addition to a unidirectional control component which is common to both tubes. The effect of grid current flow in one tube upon the control voltage of the other tube is minimized by this circuit arrangement.

The common grid-cathode circuit of both tubes, between center tap 42ᵇ and point C, may be traced from center tap 42ᵇ, through armature 14 to point N, through a potentiometer 86 from point N to potentiometer tap 86ª, through a resistor 88, and thence through a resistor 90 to point C. Potentiometer 86 is connected in parallel with coil 28ª and is energized through the bridge rectifier comprising tubes 16, 18 and 30. The tap 86ª is set so that the voltage from point N to tap 86ª is proportional to the desired speed of motor 10. This is the reference voltage.

Resistor 88 is the load resistor of a full-wave rectifier circuit comprising half-wave rectifier units 92 and 94 and the center tapped secondary winding 42ᶜ of transformer 42. As will be apparent, the rectified voltage developed across resistor 88 is proportional to the magnitude of the current in the primary winding 42ª, or armature 14, and so is proportional to the IR drop of armature 10.

The unidirectional component of the control voltage thus comprises a voltage proportional to motor IR drop, the reference voltage and the voltage developed across armature 14. The last named voltage, corrected by the IR drop voltage, indicates actual motor speed and is compared with the reference voltage in the common grid-cathode circuit. The difference voltage or error voltage is the net unidirectional component of the control voltage.

In certain applications of the system, it may be desired to adjust the grid potential of the thyratron tubes so that only a small current or no current at all is supplied to armature 14. This may be done by providing an auxiliary source of unidirectional voltage, such as battery 95 in series with potentiometer 86 between points N and C of the system. This voltage opposes the voltage developed across potentiometer 86 and forms part of the reference voltage.

A capacitor 96 is connected between points N and C and is shunted by normally closed contacts 28ᵈ. When the "Start" switch is closed and coil 28ª is energized, contacts 28ᵈ open and capacitor 96 begins charging through resistor 90 and the IR drop compensating resistor 88 to the potential of speed setting potentiometer movable contact 86ª. The potential across capacitor 96 increases at a rate which depends primarily upon the time constant of resistor 90 and capacitor 96. The polarity of the voltage drop across armature 14 is such as to make the grids of tubes 20 and 22 negative with respect to their cathodes. The voltage drops across resistor 88 and potentiometer 86, and so the voltage drop across capacitor 96, oppose the armature voltage and tend to make the tube grids positive. Thus as capacitor 96 charges it tends to increase conduction in tubes 20 and 22. The rate of increase in such conduction and so the acceleration of motor 10 depends upon the rate at which capacitor 96 is charged and the inertia of motor 10 and its load.

Other features such as motor reversal, motor inching, dynamic motor braking and so on may be incorporated in the system with relative ease and this is another advantage of the system. However, for the sake of simplicity and clarity the modifications necessary to realize these functions have to be omitted from the drawing.

In Fig. 1, the connection 100, shown dotted and extending from point D near winding 28ª to cathode 30ᵇ of tube 30, may be substituted for the connection 102, which extends from point D to center tap 32ᵇ of transformer 32. Connection 100 is preferred. When it is employed, winding 28ª is energized in parallel with coil 26ª by the full-wave rectifier comprising tubes 16, 18 and 30.

I claim:

1. In combination, an electric motor having a field winding and an armature, a diametric type full-wave rectifier circuit comprising a first pair of electron tubes connected to supply full-wave unidirectional current to said field winding, a first bridge type rectifier comprising said first pair of electron tubes and a pair of thyratrons connected to supply full-wave unidirectional current to said armature, a resistor, a second bridge type rectifier comprising a pair of half-wave rectifying elements and said first pair of electron tubes connected to supply current to said resistor, said thyratron tubes each having a cathode and a control element, a source of alternating control voltage for said pair of thyratron tubes, and circuit means to apply the alternating voltage, the voltage across said armature and a portion of the voltage across said resistor between said cathodes and said control electrodes of said pair of thyratron tubes.

2. The combination defined in claim 1, including a capacitor and a resistor in series connected in parallel with that portion of said resistor the voltage across which is applied between said cathodes and said control electrodes of said pair of thyratrons whereby the rate of acceleration of said motor is controlled as a function of the magnitude of said voltage last mentioned.

3. The combination defined in claim 1, including an electromagnetic contactor having a contact connected in series circuit with said armature and an operating winding connected to be energized with unidirectional current supplied by said second bridge type rectifier.

4. The combination defined in claim 1, including a transformer having a secondary winding and a center tapped primary winding the end terminals of which are connected to the cathode of a respective one of said thyratrons and the center tap of which is connected to said armature, and a rectifier and a second resistor connected across said secondary winding whereby there is developed across said second resistor a unidirectional voltage which is proportional to the current in said armature, said second resistor being connected to apply the voltage thereacross between said cathodes and said control electrodes of said pair of thyratrons.

5. In combination: an electric motor having a field winding and an armature; a diametric type full-wave rectifier circuit comprising a first pair of rectifier elements connected to supply full-wave unidirectional current to said field winding; a first bridge type rectifier comprising said first pair of half-wave rectifying elements and a pair of thyratrons connected to supply full-wave unidirectional current to said armature; a first resistor; a second bridge type rectifier comprising said first pair of half-wave rectifying elements and a second pair of half-wave rectifying elements to supply current to said first resistor; a source of alternating control voltage for said thyratrons comprising a source of alternating voltage having a mid-voltage terminal and a loop circuit comprising in order a first capacitor, a first output terminal, a second resistor having a mid-tap, a second output terminal and a second capacitor; said source of alternating control voltage further comprising a third resistor connected from said first output terminal to the junction of said alternating voltage source and said second capacitor and a fourth resistor connected from said second output terminal to the junction between said alternating voltage source and said first capacitor; circuit means to apply the voltage across said armature and a portion of the voltage across said first resistor between the mid-tap of the said second resistor and the cathodes of said thyratrons; and circuit means to apply the voltages between said mid-voltage terminal of said alternating voltage source and said first and second output terminals respectively to the grid of an associated one of said thyratrons.

6. A dual output phase-shifting circuit comprising: a source of alternating voltage having a mid-voltage terminal; a loop circuit connected across said source and comprising in order a first capacitor, a first output terminal, a first resistance element, a return terminal for connection with said mid-voltage terminal of said source to an external circuit, a second resistance element, a second output terminal and a second capacitor, a third resistance element connected from the connection of said first capacitor and said source to said second output terminal; and a fourth resistance element connected from the connection of said second capacitor and said source to said first output terminal.

7. A dual output phase-shifting circuit comprising: a source of alternating voltage having a mid-voltage terminal; a loop circuit connected across said source and comprising in order a first capacitor, a second output terminal, a first resistance element, a second output terminal and a second capacitor; a second resistance element connected from the connection between said first capacitor and said source to said second output terminal; and a third resistance element connected from the connection between said second capacitor and said source to said first output terminal.

8. A thyratron control system for a direct current motor comprising; a pair of thyratrons each having an anode, a control electrode and a cathode; a direct current motor having an armature and a field winding; a transformer having a secondary winding and having a center tapped primary winding the center tap of which is connected to said armature and the end points of which are connected to the cathode of a respectively associated one of said thyratrons; a rectifier and a second resistor connected across said secondary winding whereby there is developed across said second resistor a unidirectional voltage proportional to the current in said armature; a third resistor, a source to impress a unidirectional voltage across said third resistor; a source of alternating control voltage; and circuit means comprising said source last mentioned and a portion of said third resistor and said second resistor and said armature to apply the respective voltages thereacross between the control electrode and cathode of each of said thyratrons.

9. The combination defined in claim 8, including a capacitor and a fourth resistor in series connected in parallel with said portion of said third resistor and said second resistor whereby the rate of acceleration of said motor is controlled as a function of the voltage across said portion of said third resistor and said second resistor.

10. In combination, an electric motor having a field winding and an armature, a diametric type full-wave rectifier circuit comprising a first pair of rectifying elements connected to supply full-wave unidirectional current to said field winding, a first bridge type rectifier comprising a pair of thyratron tubes and said first pair of rectifying elements connected to supply full-wave unidirectional current to said armature, a resistor, a second bridge type rectifier comprising a second pair of rectifying elements and said first pair of rectifying elements connected to supply unidirectional current to said resistor, a source of unidirectional voltage connected in series with said resistor and opposing the voltage across said resistor, said thyratron tubes each having a cathode and a control element, a source of alternating control voltage for said pair of thyratron tubes, and circuit means to apply the alternating voltage, the voltage across said armature, and said source of unidirectional voltage last mentioned and a selected portion of the voltage across said resistor between said cathodes and control electrodes of said pair of thyratron tubes.

References Cited in the file of this patent

UNITED STATES PATENTS

| | | |
|---|---|---|
| 2,504,123 | Haneiko et al. | Apr. 18, 1950 |
| 2,517,101 | Few | Aug. 1, 1950 |
| 2,609,524 | Greene | Sept. 2, 1952 |
| 2,630,555 | Hursh | Mar. 3, 1953 |